Sept. 8, 1970　　　　O. V. JONES, JR　　　　3,527,126
STOCK FEEDING APPARATUS WITH CHAIN DEVICE
Filed Aug. 30, 1968　　　　　　　　　　4 Sheets-Sheet 1

INVENTOR.
OTIS V. JONES JR.
BY

*Hauke Knass Gifford & Patalidis*
ATTORNEYS

Sept. 8, 1970     O. V. JONES, JR     3,527,126
STOCK FEEDING APPARATUS WITH CHAIN DEVICE
Filed Aug. 30, 1968     4 Sheets-Sheet 3

INVENTOR.
OTIS V. JONES JR.
BY
ATTORNEYS

Sept. 8, 1970 O. V. JONES, JR 3,527,126
STOCK FEEDING APPARATUS WITH CHAIN DEVICE
Filed Aug. 30, 1968 4 Sheets-Sheet 4
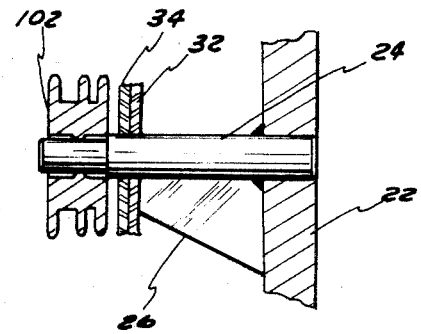
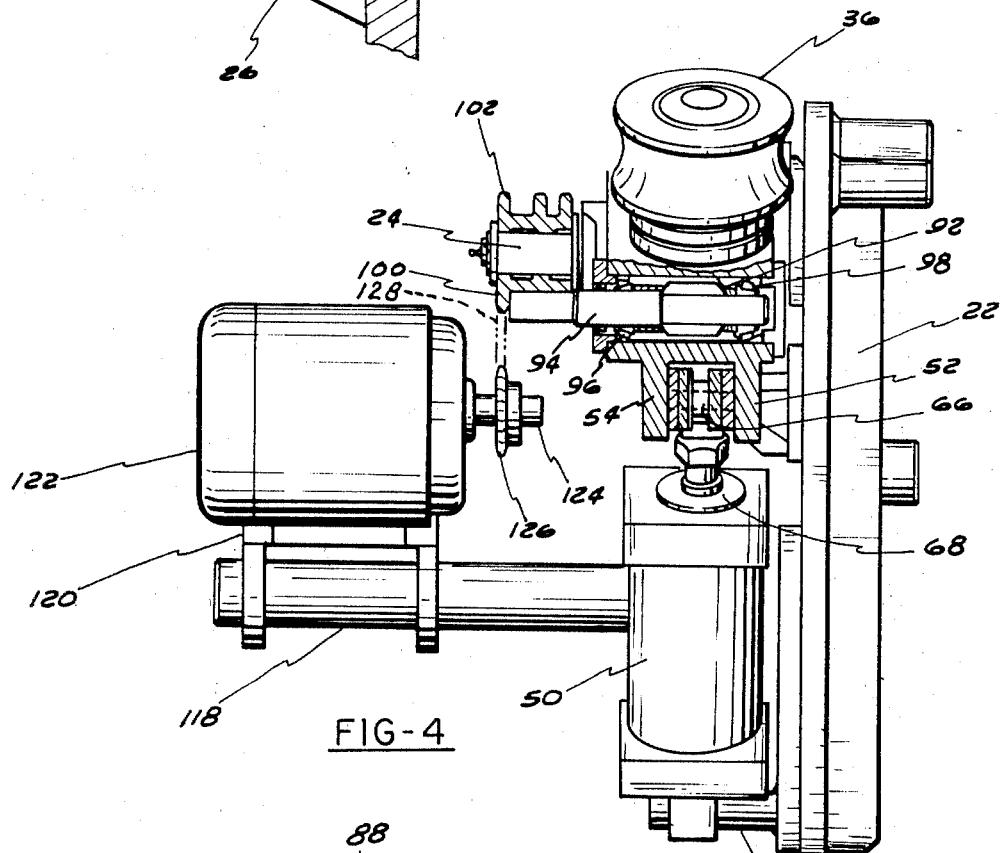
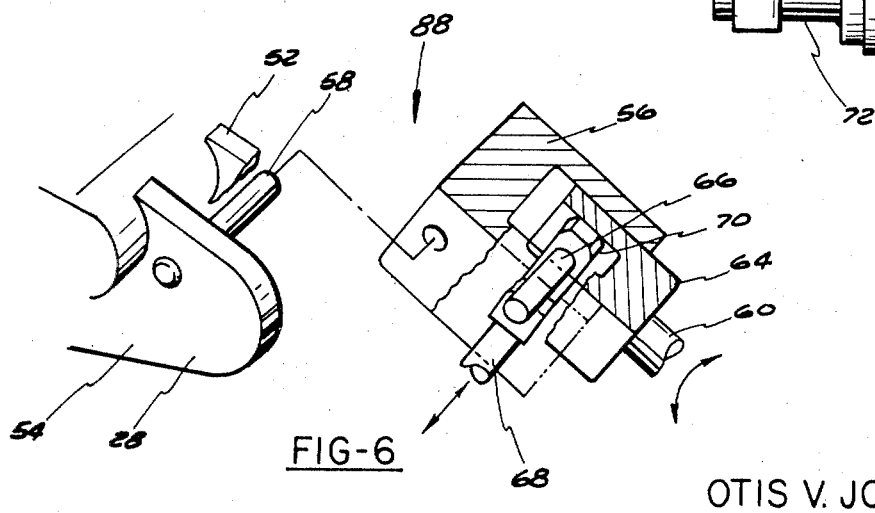
INVENTOR.
OTIS V. JONES JR.
BY
*Hauke Knass Gifford & Patalidis*
ATTORNEYS United States Patent Office 3,527,126
Patented Sept. 8, 1970

3,527,126
STOCK FEEDING APPARATUS WITH
CHAIN DEVICE
Otis V. Jones, Jr., Dearborn, Mich., assignor to Acro Feed Industries, Inc., Detroit, Mich., a corporation of Michigan
Filed Aug. 30, 1968, Ser. No. 756,487
Int. Cl. B23b 13/00
U.S. Cl. 82—2.5                               9 Claims

ABSTRACT OF THE DISCLOSURE

Feed apparatus for servicing a screw machine or the like with bar stock including a pair of rollers pivotally supported for motion about a common pivot between an open position for receiving a section of stock between them and a closed position for engaging the stock, and chain drive means coupled to the rollers to provide the stock with a longitudinal force in the direction of the machine. Each roller is pivoted between its open and closed position by a toggle linkage.

BACKGROUND OF THE INVENTION

Field of the invention

This invention relates to apparatus for feeding a section of bar stock into a machine having a work spindle and more particularly to a feed device with a pair of cooperating rollers for engaging the stock between them and which rotate in a manner to provide a longitudinal force on the stock.

Description of the prior art

Metal working machines such as multi-spindle screw machines form a series of identical parts from a length of bar stock and normally operate at rates requiring automatic feed devices in order to supply them with sufficient stock to maintain them in constant operation. Ordinarily a magazine is periodically loaded with a number of bars which are then individually fed into the machine as the bars are consumed. The bar stock is fed longitudinally through the collet of the serviced machine until its leading end abuts a stop beyond the collet. The collet then closes on the bar and the machine performs the metal cutting operation on the supported length. A cut-off bar separates the finished part from the remaining bar after the operation is completed, the collet opens and another section of bar is pushed against the stop.

Loaders have been disclosed in the prior art in which the bar is advanced longitudinally through the collet by a pair of cooperating rollers. Such a feed system is illustrated in my Pat No. 2,811,884, issued Nov. 5, 1957. The rollers are pivotally mounted on a pair of supports. A power cylinder is mounted on one of the supports with its rod engaged with the other support so that movement of the rod between its extended and retracted positions alternately moves the rollers between an open position for receiving a section of stock between them and a closed position for engaging the stock. One of the rollers is mounted on a spindle which is coupled to the out-put shaft of a drive motor by a telescopic linkage and each of the rollers carry gear means which mesh when the rollers are in their closed position so that the two rollers rotate together and provide a longitudinal force on the bar stock.

The broad purpose of the present invention is to provide improved means for mounting the rollers between their open and closed positions and for driving rollers when they are engaged with a section of stock.

SUMMARY OF THE INVENTION

The feed apparatus illustrating the preferred embodiment of the invention is mounted adjacent a magazine in which the bar stock is individually loaded into a guide and then pushed from the guide toward the rollers which upon engaging the stock advance it through the collet of a screw machine. Each roller is rotatably mounted on a support with the two supports being mounted on a common pivot on a supporting frame. The two supports are pivoted toward and away from one another in a scissors-like manner by a toggle linkage associated with each support. Each toggle linkage is actuated by an actuating air cylinder which is connected to open and close the rollers. The toggle linkage increases the mechanical advantage of the actuator so that a cylinder of a nominal size can be effectively employed to fold and unfold the linkage.

The drive means for rotating the rollers when they are engaged with the workpiece form a major feature of the invention. Each roller is mounted on a spindle which is rotatably mounted on its respective support. A primary chain sprocket is rotatably mounted on the same pivot on which the two supports are mounted. The primary sprocket is drivingly coupled to the two spindles by a secondary sprocket and chain on each support, each secondary sprocket being connected by a pair of gears to each spindle. Thus rotation of the primary sprocket causes the two secondary sprockets and the two rollers to rotate. A drive motor on the frame is connected by a drive sprocket and chain with the primary sprocket. This drive arrangement provides a number of advantages over the art. The rollers do not have to be formed with a gear. Thus they are less expensive to replace. The life of the device is now determined by roller wear-out rather than gear wear-out as in prior art machines. This has resulted in a longer useful life which is an important economic advantage.

Other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views, and in which:
FIG. 4 is a side elevational view of the preferred feed apparatus;
FIG. 5 is a sectional view showing the main pivot upon which the supports are mounted;
FIG. 6 is an enlarged, fragmentary, perspective view showing the toggle linkage arrangement.

DESCRIPTION OF THE PREFERRED EMBODIMENT

Figure 1:
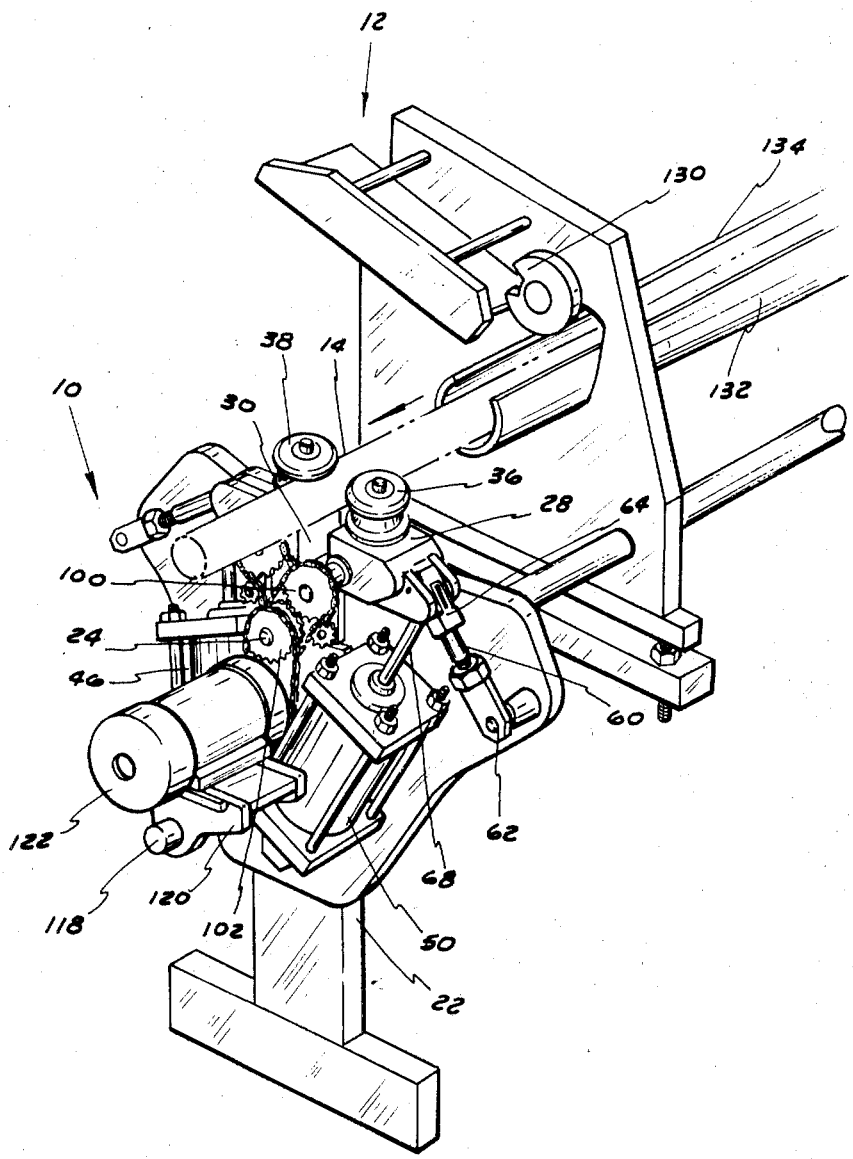
FIG. 1 is a perspective view of the preferred feed apparatus mounted adjacent a stock feed magazine.
Figure 7:
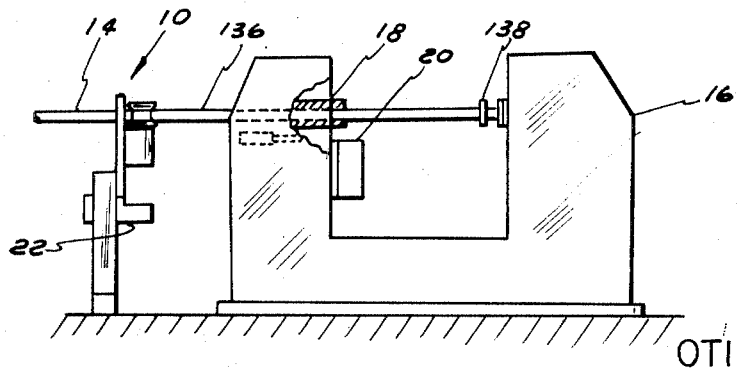
FIG. 7 is a schematic view illustrating the relative relationship of the apparatus to the machine being serviced.

Now referring to FIGS. 1 and 7, a preferred feed apparatus 10 is illustrated as being mounted between a magazine 12 in which stock is periodically loaded and is adapted to transfer individual lengths of bar stock 14 from the magazine 12 to a screw machine 16. Machine 16 has collet means 18 which are intermittently opened to receive the stock and closed to support the stock for a cutting operation by a tool 20.

Figure 2:
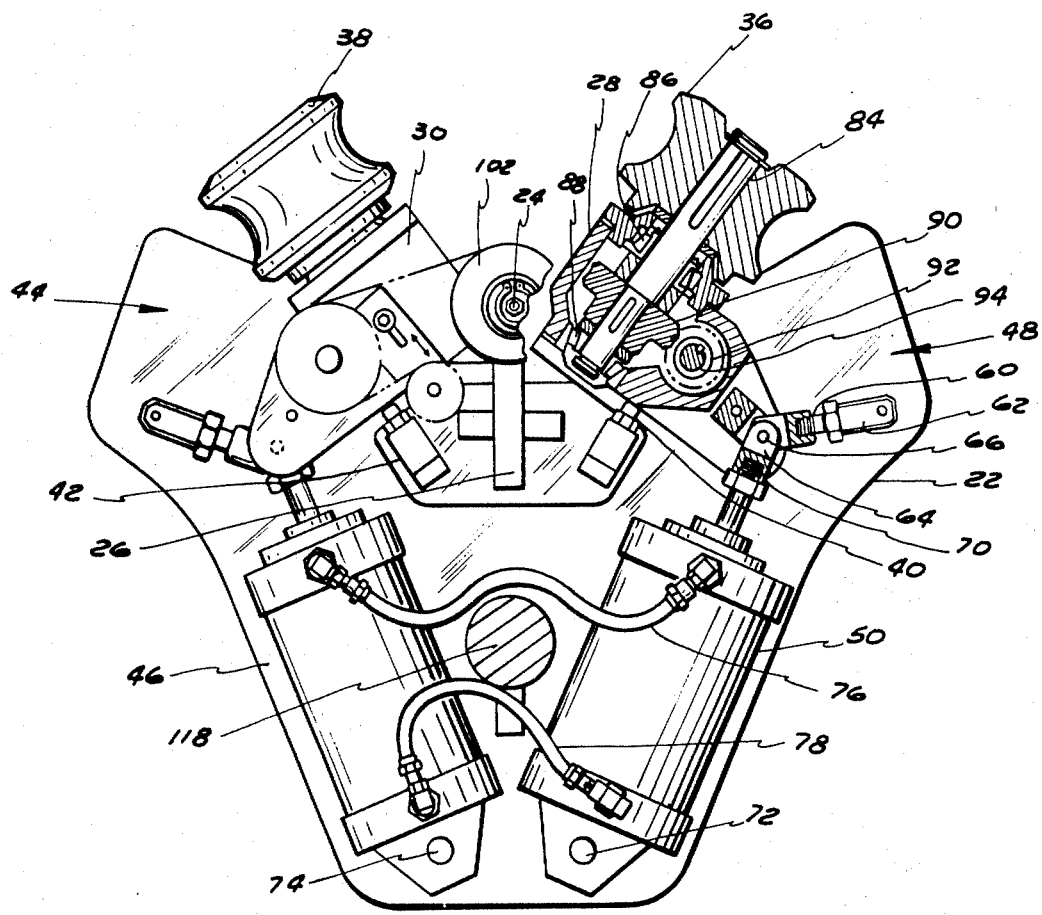
FIG. 2 is an elevational view showing the rollers in their open position.

Referring to FIGS. 1, 2 and 5, the feed apparatus 10 includes an upright frame 22. A hinge pin 24 is fixedly mounted on the frame 22 as can best be seen in FIG. 5. A reinforcing plate 26 supports the pin 24 for vertical loads and a pair of box-like supports 28 and 30 having plate like extensions 32 and 34 are pivotally mounted on the hinge pin 24 for motion toward and away from one another. A pair of rollers 36 and 38 are rotatably mounted on the supports 28 and 30 respectively. The rollers 36 and 38 are movable relative to one another between a position illustrated in FIG. 3 wherein they engage the workpiece 14 and a position spaced from one another wherein the support 28 abuts means 40 mounted on the frame and the support 30 abuts a stop means 42.

The position of the roller 38 is governed by a toggle linkage means generally indicated at 44 which connects the support 30 with a hydraulic actuator 46. The position of the roller 36 is governed by a toggle linkage means 48 which connects the support 28 with a hydraulic actuator 50. The toggle linkage means 44 and 48 are similar to one another except for a right and left hand relationship so that a description of the linkage 48 is to be understood as being applicable to the linkage 44.

Referring to FIGS. 2 through 6 for a description of the toggle linkage, the support 28 has a pair of laterally extending plate like lugs 52 and 54. A first U-shaped link member 56 is pivotally mounted by a pin 58 between the plate sections 52 and 54. A second link member 60 has one end pivotally attached by a fastener 62 to the frame 22, and its inner end attached to a clevis 64 which is disposed between the plates 52 and 54. The clevis 64 is joined to the outer end of the link 56 by a floating pin 66 that moves between the two plate like sections 52 and 54 as the links 56 and 60 move between folded and unfolded positions relative to one another.

The cylinder 50 is pivotally mounted on the frame 22 and has an extendible rod 68 which carries a tongue like fastener 70. The fastener 70 is connected to the pin 66 between the legs of the clevis and the link 56. As the actuating cylinder 50 extends the rod, the two links gradually unfold and cause the roller member 36 to move toward its closed position. When the rod 68 is retracted, the link members 56 and 60 gradually fold toward one another and cause the roller 36 to move away from the roller 38 toward its open position so that the two rollers can receive the stock 14 between them. It can be seen from FIGS. 2 and 3 that as the rod 68 is extended from its fully retracted position the links 56 and 60 unfold in such a manner that they provide an increasing mechanical advantage between the cylinder 50 and the support 28. Thus a relatively small cylinder can provide a substantial force on the supports when its rod is fully extended.

Figure 3:
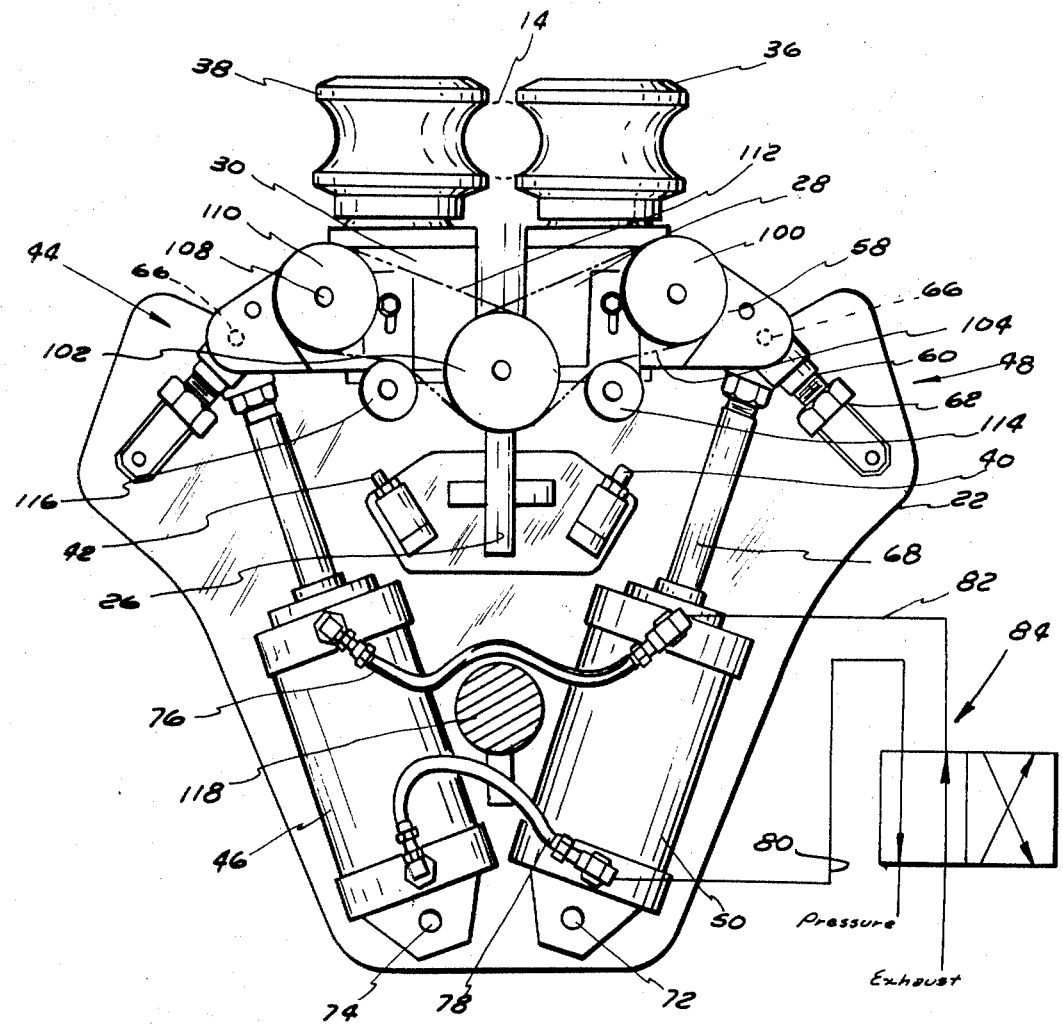
FIG. 3 is a view similar to FIG. 2 but showing the rollers in their closed position.

As best seen in FIG. 3, the lower end of the cylinder 50 is mounted by a pin 72 to the frame 22 and the lower end of cylinder 46 is pivotally mounted by a pin 74 to the frame 22. The motion of the rods is provided by air pressure acting on an internal piston in each of the cylinders so that removal of fluid from the upper end of the two cylinders with the introduction of pressurized fluid into their lower ends causes the rods to extend, and similarly the removal of fluid from the lower ends of the cylinder and the introduction of fluid into their upper ends causes the rods to retract. The upper ends of the cylinders 46 and 50 are interconnected by a flexible conduit 76 and their lower ends connected by a flexible fluid conduit 78 so that the two cylinders act together in moving the rollers 36 and 38 between their open and closed positions. The cylinders 46 and 50 are connected to a source of pressurized fluid and exhaust means by fluid lines 80 and 82 through valve means 84. The operation of the valve is preferably by an automatic means (not shown) which is governed by the condition of the collet 18.

Now referring to FIGS. 2, 3 and 4 for description of the drive means, the drive components are internally mounted within the supports 28 and 30 and are similar to one another except for a right-hand and left-hand relationship so that it is to be understood that a description of the means for driving the roller 36 will also apply to the roller 38. As best seen in FIGS. 2 and 4, the roller 36 is keyed to a spindle 84 which is journaled in a pair of spaced bearings 86 and 88 mounted within the support 28. A gear 90 is mounted on the spindle 84 and is complementary with a companion gear 92 mounted on a short shaft 94 journaled in the support 28 at right angles to the spindle 84. The shaft 94 is journaled in a pair of spaced bearing means 96 and 98 as can best be seen in FIG. 4. A secondary sprocket 100 is keyed to the outer end of the shaft 94.

The outer end of the hinge pin 24 supports a main sprocket 102. A chain 104 couples the main sprocket 102 with the sprocket 100. Thus rotation of the main sprocket 102 produces rotation of the secondary sprocket 100 and rotation of the roller 36.

Similarily, a shaft 108 is mounted in the support 30 and driveably coupled through gear means (not shown) to the roller 38. A secondary sprocket 110 is mounted on the outer end of the shaft 108 and connected with the main sprocket 102 by a chain 112 so that rotation of the main sprocket 102 produces rotation of the roller 38 and the roller 36. Thus the rollers 36 and 38 cooperate in producing a longitudinal force on the bar stock 14 when they are in their closed position. A chain take-up device 114 mounted on support 28 engages the lower section of the chain 104 to remove any slack in the chain. Similarily a chain take-up device 116 mounted on the support 30 is engaged with the lower portion of the chain 112 to maintain the chain in a properly tensioned condition. It is to be noted that by mounting the supports 28 and 30 on the same hinge pin which provides the support for the primary sprocket 102 that two rollers can be pivoted between their open and closed positions without affecting their individual driving connections with the main drive sprocket.

An elongated rod like support 118 extends from the frame 22 and supports a motor-mounting pedestal 120 as can best be seen in FIG. 4. A motor 122 mounted on the pedestal 120 has an output shaft 124 supporting a drive sprocket 126. The drive sprocket 126 is connected to the main sprocket 102 by a chain 128. Thus it can be seen that although both rollers are driven through a common power source that they are driven from the primary sprocket through an individual drive consisting of chain and sprocket means and gear means. It can further be seen that as the rollers 36 and 38 loose their tolerances by wear, they can be replaced without replacing the drive components.

Referring to FIGS. 1 and 7, the bar 14 is fed from the magazine 12 by an escapement member 130 which individually feeds the stock into a pair of split tube guide sections 132 and 134 which open to receive the stock and then close around the stock. The bar stock 14 is advanced by pusher means (not shown) so that it is ordinarily in abutment with the preceding section of stock 136 and is engaged by the rollers 36 and 38 which advance the two sections of stock through the open collet 18 of the machine. The stock is advanced until the leading end of the forward section of stock 136 abuts a stop 138. A suitable control circuit (not shown) causes the collet 18 to close and the tool 20 to machine a portion of the stock supported between a collet 18 and the stop 138. When the stock has been machined, cut-off means (not shown) cut off the finished section of stock and the feed cycle is again initiated. Thus the feed rolls 36 and 38 are normally arranged to feed the stock only as long as the collet 18 is open.

It is to be understood that although I have described but one embodiment of my invention that various changes and revisions can be made therein without departing from the spirit of the invention as expressed in the scope of the appended claims.

Having thus described my invention, I claim:

1. Apparatus for feeding a section of bar stock to a machine having a collet for receiving the stock, comprising:
   (a) a frame means;
   (b) a main pivot on said frame means;
   (c) a pair of supports each mounted on said main pivot for pivotal motion toward and away from one another;
   (d) a pair of rotatable members, one of said pair being mounted on each support;
   (e) means for pivoting said supports between an open position to space said rotatable members for the reception of a section of stock between said rotatable members, and a closed position wherein said rotatable members engage the stock between them;
   (f) means for rotating said rotatable members so that they cooperate in providing a longitudinal force on the stock between them in the direction of the machine, comprising:
      (1) a main sprocket rotatably mounted on said main pivot;
      (2) a pair of secondary sprockets;
      (3) means for rotatably mounting one of said secondary sprockets on each of said supports;
      (4) means connecting each of said secondary sprockets with the rotatable member on its support so that rotation of each secondary sprocket produces rotation of its respective rotatable member;
      (5) chain means connecting said main sprocket with each of said secondary sprockets so that said rotatable members rotate as said main sprocket rotates; and
      (6) drive means on said frame for rotating said main sprocket.

2. A stock feeding apparatus as defined in claim 1, including stock guide means for supporting a length of stock, and wherein said rotatable members are aligned with said stock guide means when they are in their closed position.

3. A stock feeding apparatus as defined in claim 1, wherein the means for mounting each of said secondary sprockets comprises a shaft rotatably mounted on each support, means for mounting said secondary sprocket on said shaft and including a spindle rotatably mounted on each support, means for mounting each rotatable member on said spindle and gear means connecting the rotation of each of said shafts with its respective spindle.

4. A stock feeding apparatus as defined in claim 3, including chain take-up means mounted on each of said supports and operatively engaged with said chain means.

5. A stock feeding apparatus as defined in claim 1, wherein the means for pivoting each of said supports comprises a pair of links, the first of said links having one end pivotally mounted to a support in spaced relationship with said main pivot, the second of said links pivotally attached to said frame, pin means pivotally joining the other end of each of said links, an actuator means connected to said pin means for motion in a first direction to fold said pair of links and move the support in a first direction about said main pivot and in an opposite direction to unfold said pair of links and move the support in a reverse direction about said main pivot.

6. The apparatus as defined in claim 5, wherein said actuator means comprises a fluid cylinder mounted on said frame having an extendible rod connected to said pin means.

7. The apparatus as defined in claim 5, wherein the pair of links connecting each actuator with its support provides an increasing mechanical advantage between said actuator and said support as said links are unfolded.

8. The apparatus as defined in claim 5, wherein the actuator means comprises a fluid power cylinder associated with each pair of links, each of said cylinders being mounted on said frame and having an extendible rod operatively connecting each pair of links, and including means for actuating said cylinders to simultaneously move said rotatable members between open and closed positions, with respect to one another.

9. The apparatus as defined in claim 1, wherein the means for mounting each of said secondary sprockets comprises a pair of shafts, one of said shafts being mounted on each of said supports, means for mounting one of said secondary sprockets on each of said shafts, and including a spindle rotatably mounted on said support, means for mounting a rotatable member on each spindle and gear means connecting the rotation of each of said shafts with each of said spindles; and wherein the means for pivoting each of said supports comprises a pair of toggle links, the first of said links having one end pivotally attached to a support in spaced relationship with said main support, the second of said links pivotally attached to said frame, pin means pivotally joining the other end of each of said pair of links, a fluid cylinder operatively connected to said pin means for motion in a first direction wherein the pair of links fold to move the support away from the other of said supports and in an opposite direction to unfold the pair of links and move the support in a reverse direction toward the other of said supports, and including means interconnecting said fluid cylinders so as to cause said cylinders to simultaneously move said rotatable members between their open and closed positions.

References Cited

UNITED STATES PATENTS

| | | | |
|---|---|---|---|
| 1,939,320 | 12/1933 | Rupple | 82—2.5 XR |
| 3,147,653 | 9/1964 | Jones | 82—2.7 |

LEONIDAS VLACHOS, Primary Examiner

U.S. Cl. X.R.

82—38; 226—176

UNITED STATES PATENT OFFICE
CERTIFICATE OF CORRECTION

Patent No. 3,527,126          Dated 9-8-70

Inventor(s) O. V. Jones Jr.

It is certified that error appears in the above-identified patent and that said Letters Patent are hereby corrected as shown below:

Change the title to read:

--"Stock Feeding Apparatus with Chain Drive"--

SIGNED AND
SEALED
DEC 8 - 1970

(SEAL)
Attest:

Edward M. Fletcher, Jr.

Attesting Officer

WILLIAM E. SCHUYLER, JR.
Commissioner of Patents